(12) United States Patent
Ykema

(10) Patent No.: US 6,377,874 B1
(45) Date of Patent: Apr. 23, 2002

(54) POWER DISTRIBUTION SYSTEM INCLUDING INTEGRATED POWER NODE CONTROL CENTER

(75) Inventor: John I. Ykema, Broomall, PA (US)

(73) Assignee: SPD Technologies Inc., Philadelphia, PA (US)

( * ) Notice: Subject to any disclaimer, the term of this patent is extended or adjusted under 35 U.S.C. 154(b) by 0 days.

(21) Appl. No.: 08/303,046

(22) Filed: Sep. 7, 1994

(51) Int. Cl.[7] .............................. H02J 3/00; H02B 1/20
(52) U.S. Cl. ........................................ 700/286; 361/637
(58) Field of Search .................................. 364/480, 481, 364/483, 492; 361/636, 637, 640, 624; 700/286

(56) References Cited

U.S. PATENT DOCUMENTS

| | | | | |
|---|---|---|---|---|
| 4,335,437 A | * | 6/1982 | Wilson et al. ............... | 364/492 |
| 4,357,665 A | * | 11/1982 | Korff .......................... | 364/492 |
| 4,511,981 A | * | 4/1985 | Andow et al. ............... | 364/492 |
| 4,771,185 A | * | 9/1988 | Feron et al. ................. | 364/492 |
| 4,777,607 A | * | 10/1988 | Maury et al. ................ | 364/492 |
| 4,819,180 A | * | 4/1989 | Hedman et al. ............. | 364/492 |
| 4,985,845 A | * | 1/1991 | Gotz et al. ................... | 364/492 |
| 5,231,565 A | * | 7/1993 | Bilas et al. .................. | 364/492 |
| 5,237,511 A | * | 8/1993 | Caird et al. ................. | 364/492 |
| 5,251,157 A | | 10/1993 | Prather ....................... | 364/492 |
| 5,323,307 A | * | 6/1994 | Wolf et al. .................. | 364/492 |
| 5,373,411 A | * | 12/1994 | Grass et al. ................. | 364/492 |
| 5,414,640 A | * | 5/1995 | Seem .......................... | 364/492 |
| 5,436,510 A | * | 7/1995 | Gilbert ........................ | 364/492 |

\* cited by examiner

Primary Examiner—Eric B. Stamber
(74) Attorney, Agent, or Firm—Charles N. Quinn

(57) ABSTRACT

An electrical integrated power node control center (2) including a power bus (4') to the control center, bus bars (F) for power distribution within the control center, a node power distribution device (A), a plurality of functional distribution devices within the node (B, C, D), and a control system (E). The control system includes controlling the functional distribution devices to either connect/disconnect or change the on/off state based on electrical system data gathered by monitoring the input/output data. The control system is also adapted to monitor the health of the functional distribution devices to initiate diagnostic procedures as well as display or record information.

41 Claims, 5 Drawing Sheets

# POWER DISTRIBUTION SYSTEM INCLUDING INTEGRATED POWER NODE CONTROL CENTER

FIELD AND BACKGROUND OF THE INVENTION

This invention relates to power distribution systems and to methods and apparatus for controlling and protecting such power distribution systems, with emphasis on power distribution systems used in both military and commercial nautical applications and large land transportation vehicles.

DESCRIPTION OF THE PRIOR ART

Electrical power distribution systems normally include power sources and many loads, with the loads connected to the sources by branches. Typically, those branches connect together at nodes. The nodes and branches may be provided in a hub and spoke configuration.

Typically, nodes are custom-tailored to fit a particular need of the electrical power distribution system at a particular node location. Small nodes may handle small blocks of power. Large nodes may handle large blocks of power and include numerous functions performed at the node. One type of node is a power panel, which is typically a small node and in the prior art, incorporates some degree of standardization.

Power systems may generally be characterized as low voltage or high voltage power systems. Low voltage power systems for purposes herein are considered to be power systems in which voltage is less than about 1,000 volts.

In low voltage power systems, the nodes vary in power handling capacity from less than 10 kilowatts to over 5 megawatts. Node functions vary from simple distribution to very complex distribution, automatic switching, frequency conversion, voltage conversion, power quality regulation and various types of system protection control and multiple operating control functions.

Current practice in designing electrical power distribution systems, either for original construction or for modification and upgrading, is to identify the functional and characteristic requirements for each node. Node functional requirements establish the number of incoming and outgoing circuits to and from the node.

In current commercial practice, when a power system is designed, the power system designer also identifies the type(s) of switching devices to be utilized at a node and the rating of each such device. The designer further identifies the type of control available for each node and whether such control should be manned or automatic. Current practice is also for a power system designer to specify the type of protection, if any, to be provided at a given node.

In current commercial practice, it may be necessary or desirable to perform frequency and/or voltage conversion at nodes.

Typically, all of the equipment required to be present at a given node is not produced by a single entity, making it necessary to secure various components used at a node from different manufacturers. Conventionally, a switchgear producer may acquire and assemble many of the components and much of the equipment for each node, but must design and custom engineer each node before each node can be produced; this is especially true with more complex nodes. As a result, each node typically takes on its own identity and is not thereafter easily changed. This means the power distribution system which eventually results loses flexibility early in the design process for the system, since lead time for purchase of a node and node equipment includes the time required to design or custom engineer certain equipment required to facilitate the functions to be performed at the node.

Conventionally, a power system node may contain several distinct elements which are not preassembled. In such case, it is necessary to install individual components, connect those components after installation and then test the installed, connected components for proper operation, after those components have been installed at a given node.

SUMMARY OF THE INVENTION

The primary thrust of this invention is towards low voltage electrical power systems, namely systems in which the voltage is less than about 1,000 volts.

This invention provides an electrical power distribution system which includes a plurality of branches for carrying power with the branches being interconnected at nodes. The system further includes at least one means for supplying power for distribution within the system where the power supply means is connected to a branch. The system further includes at least one load, consuming power supplied to the load, where the load is connected to a branch other than the branch having the power supply means connected thereto.

In another of its aspects, this invention provides scaleable, standardized integrated power node control centers which are modular in construction to facilitate accommodation of changes in power system requirements and which may be easily upgraded in the event of future changes to the power distribution system.

In yet another of its aspects, this invention provides a bus structure which accommodates a variety of different types and sizes of modules which can be connected together to define a desired integrated power node control center. This standardized bus structure accommodates a variety of components for switching, conversion and/or power regulation.

In another of its aspects, this invention provides multiple levels of integrated power node control centers where the levels are based on the amount of power a node handles and on the number of incoming and outgoing branches or circuits.

In a further aspect this invention provides an electrical power node control center which includes a plurality of bus bars for carrying electrical power, means for inputing power to the node control center for distribution within the node control center by the plurality of bus bars, at least one power distribution device for regulating and controlling power distributed by a node associated with and preferably contained within the node control center, means housing a plurality of functional distribution devices for controlling power flow between said first input and one or more outputs from said node contained within said control center, means for connecting said distribution devices to the plurality of bus bars, a control system for monitoring input power to the node and output power of each output connection from the node, a control system for monitoring the electrical system data of the node and commanding at least one of said functional distribution devices that disconnect the node output circuit or to stop power flow to the connected output circuit if an undesirable condition is detected on the output circuit, wherein said control system utilizes programmable means for performing such monitoring and commanding, a control system connected to the overall electrical central control which by input signal changes the state of one or more of the functional distribution devices from a given state to an opposite state, a control system for also monitoring the health of the functional distribution devices and sending a command to automatically alter the device for self-correcting, turning the device off or sending a warning signal to the central control system and where the control systems include monitoring or sensing means, processing means which process the sensed data according to a predetermined or adaptive algorithm and having an output function which may command action, display information or record data.

The integrated power node control center preferably performs functions selected from the group including switching, voltage conversion, frequency conversion and voltage regulation.

In yet another of its aspects this invention provides an integrated power node control center having at least one operating control module and at least one protection control module adapted for connection to a bus bar structure for performing one or more of the control functions where the control modules perform one or more functions selected from the group of protection control functions which include but are not limited to over-current protection, ground current protection, over and under voltage protection, over and under frequency protection, differential current protection, phase current imbalance protection and open circuit protection, and wherein the control module performs one or more of the functions selected from a group of operating control functions which include but are not limited to state monitoring of all inputs and of all outputs, health monitoring of all functional power distribution devices, diagnostic monitoring of the control functions, communicating control information to a central control station or other integrated power node control centers, receiving and operating on information and commands from the central control station or other integrated power node control centers, displaying information of the integrated power node control center and such other control functions as may be desirable for proper operation of the integrated power node control center.

Figure 1:
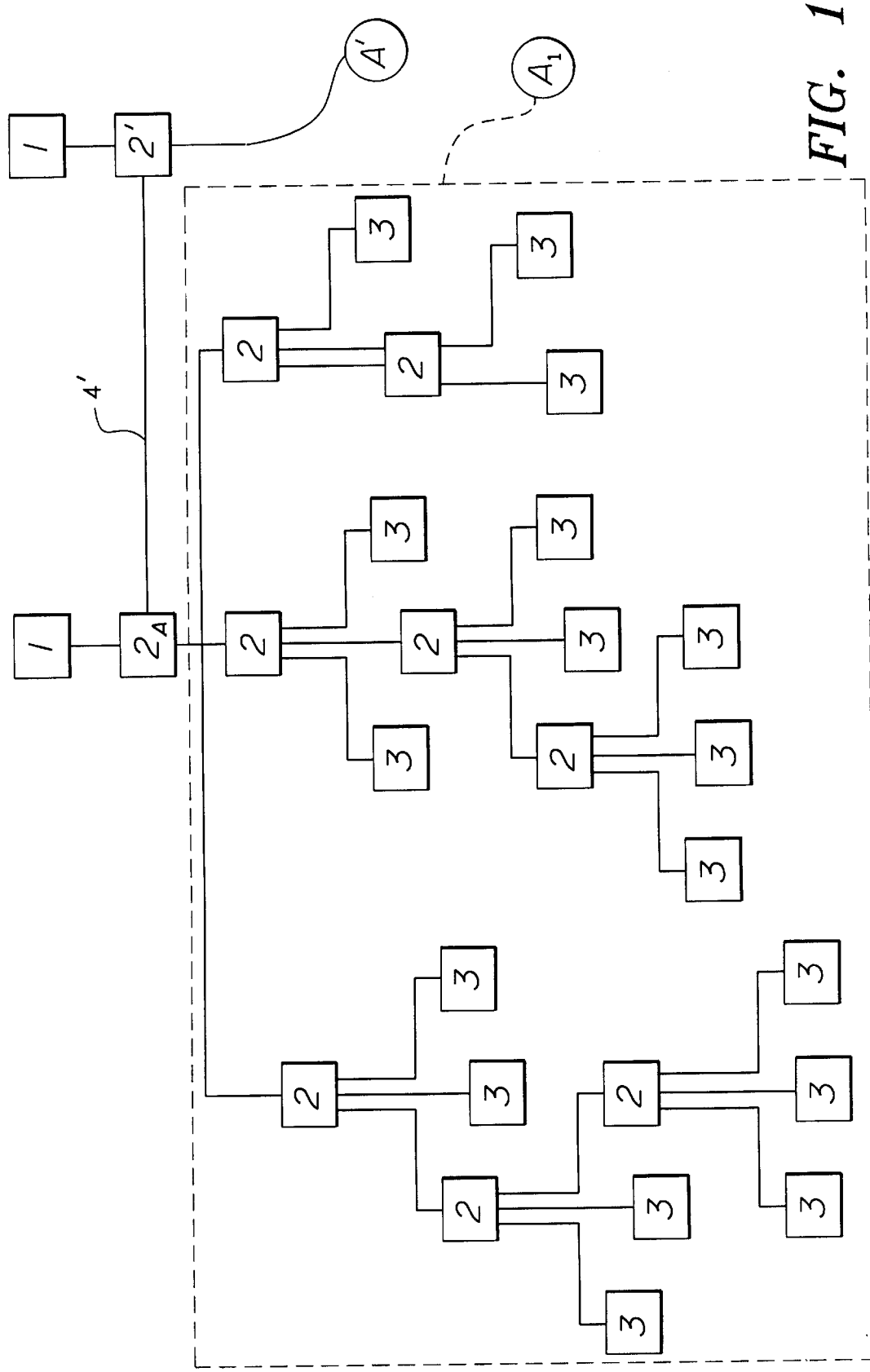
FIG. 1 is a schematic representation of a power distribution and power delivery system including integrated power node control centers, manifesting aspects of the invention.

In the drawings, indicator numerals correspond to numerals used to identify particular components, parts and the like in the following Description of the Preferred Embodiments and Best Mode Known for Practicing the Invention.

DESCRIPTION OF THE PREFERRED EMBODIMENTS AND BEST MODE KNOWN FOR PRACTICING THE INVENTION

Referring to the drawings in general and to FIG. 1 in particular, there is depicted a power distribution system manifesting aspects of the invention where the power distribution system, which is not numbered, includes a plurality of power sources with each power source being designated generally 1. The power distribution system further includes a plurality of loads, each of which is designated generally 3, receiving power supplied by power sources 1 and performing various functions in accordance with the design of the power distribution system. The system further includes a plurality of integrated power node control centers, each of which has been designated generally 2. The system further includes a plurality of branches 4 for carrying electrical power supplied by sources 1 to loads 3. Branches 4 interconnect at control centers 2 as illustrated in FIG. 1.

Dotted rectangle $A_1$ in FIG. 1 has been drawn to surround a plurality of the control centers 2, loads 3 and branches 4. Several collections of such control centers 2, loads 3 and branches 4 as are within rectangle $A_1$ may be provided as a part of the power distribution system. Balloon A' indicates schematically where a second collection of control centers 2, loads 3 and branches 4 might be connected to a control center 2' to receive power from a power source 1', as well as from power source 1 as a result of control centers $2_A$ and 2' being connected by branch 4'.

Figure 4:
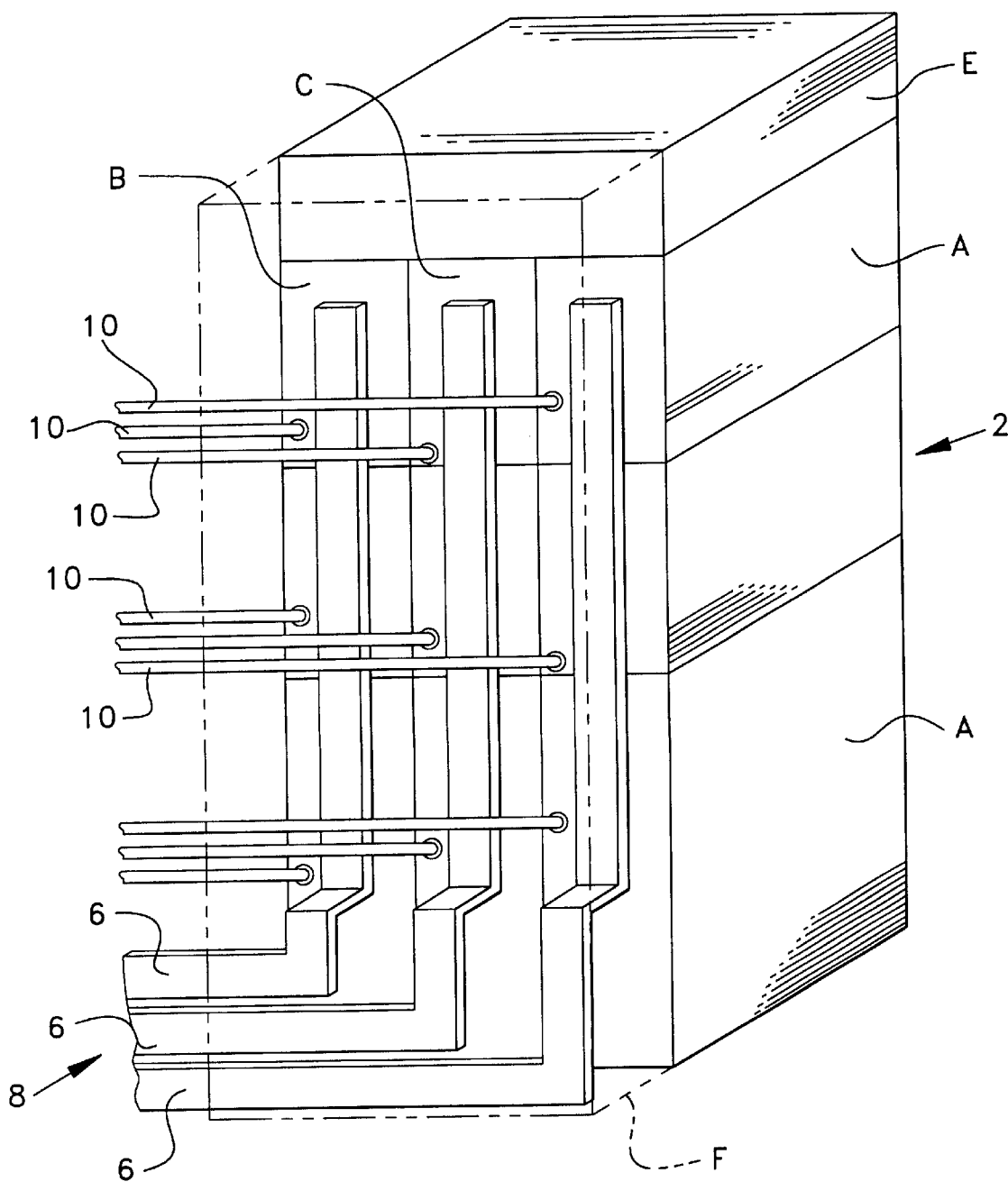
FIG. 4 is an isometric drawing of a modularly constructed, integrated power node control center manifesting aspects of the invention.

A modularly constructed version of an integrated power node control center 2 is illustrated in FIG. 4 in schematic, isometric form. Integrated power node control center 2 is electrically connected to three bus bars, each of which is designated generally 6, and which extend from a power bus designated generally 8.

Each integrated power node control center 2 includes a protection and operating control module designated generally E in FIG. 4, and incoming power module designated generally A in FIG. 4, at least one output power module or function module three of which have been illustrated in FIG. 4 and have been designated B, C and D respectively, and a power bus backplane module which has been shown only in dotted lines in FIG. 4 and is designated F.

The three electrical bus bars designated generally 6 are housed within power, bus backplane module F for connection thereto with incoming power modification module A function and modules B, C and D. The bus bar structures 6 are preferably standardized and constructed to define a plane in a control backplane module F, thereby accommodating all control modules and power modules as required by the integrated power node control center.

The control systems included within the protection and operating control module E serve to monitor input power to the node and output power of each output connection from the node and further preferably intelligently command at least one functional distribution device to disconnect the node output circuit or to stop power flow to the connected output circuit if an undesirable condition is detected on the output circuit. Outputs are provided from the various modules via cables indicated generally 10 in FIG. 4.

The power node control center of the invention, of which a plurality are preferably used in the power distribution system as illustrated schematically in FIG. 1, features maximum flexibility to permit reconfiguration and scaling of the power distribution system. Use of the power node control center, which is preferably entirely integrated, lowers equipment and construction costs for multi-purpose multi-mission ships and for power systems used in other environments. The integrated power node control center streamlines the power delivery system by combining all of the functions required or performed at the node points of the power delivery system into a single, integrated, factory-built and factory-tested power node control center. This enhances the function of the power delivery system, namely to provide and assure availability of quality electric power to a maximum number of loads for the maximum safely permissible time in the most efficient possible manner.

The integrated power node control center of the invention provides for integration of power, protection and control functions and interfaces between and among those functions to be packaged in affordable, standardized, scaleable, modular upgradable structures. The heart of a power delivery system according to the invention is the open architecture of the power node control center power distribution backplane integrated with standardized power modules and intelligent/programmable protection/control subsystems utilizing microprocessors and similar software-driven elements to perform the control and monitoring functions.

The power node control center establishes a standardized family line which can be readily reconfigured to accommodate varying numbers in inputs and outputs along with a variety of power protection and control functions. Architecture of the power backplane, which is preferably reconfigurable, the provision of standardized power modules and creation of intelligent and programmable protection and operating control subsystems as embodied in the protection and operating control module, all lead to high efficiency and low cost for the integrated power node control center. As a result an entire power distribution system can be fabricated from only power cables and the standardized integrated power node control centers.

Figure 3:
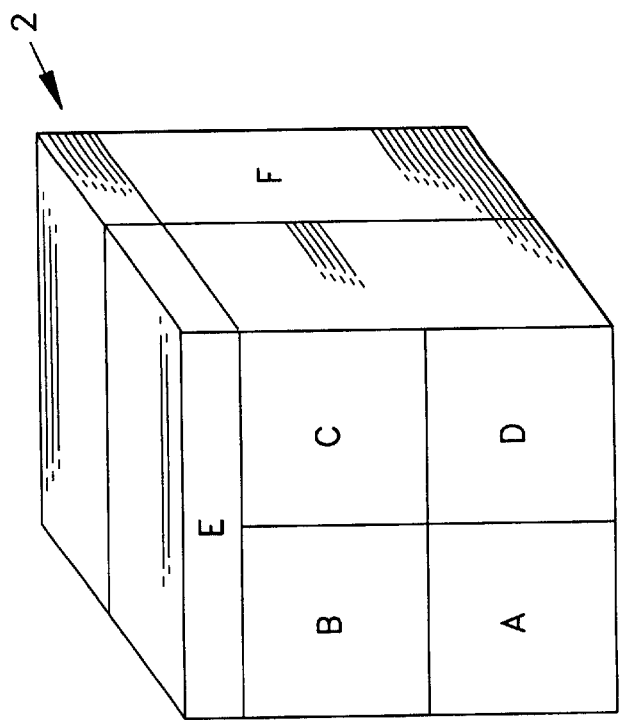
FIG. 3 is a more concrete representation of the integrated power node control center illustrated in FIG. 2 manifesting aspects of the invention.
Figure 5:
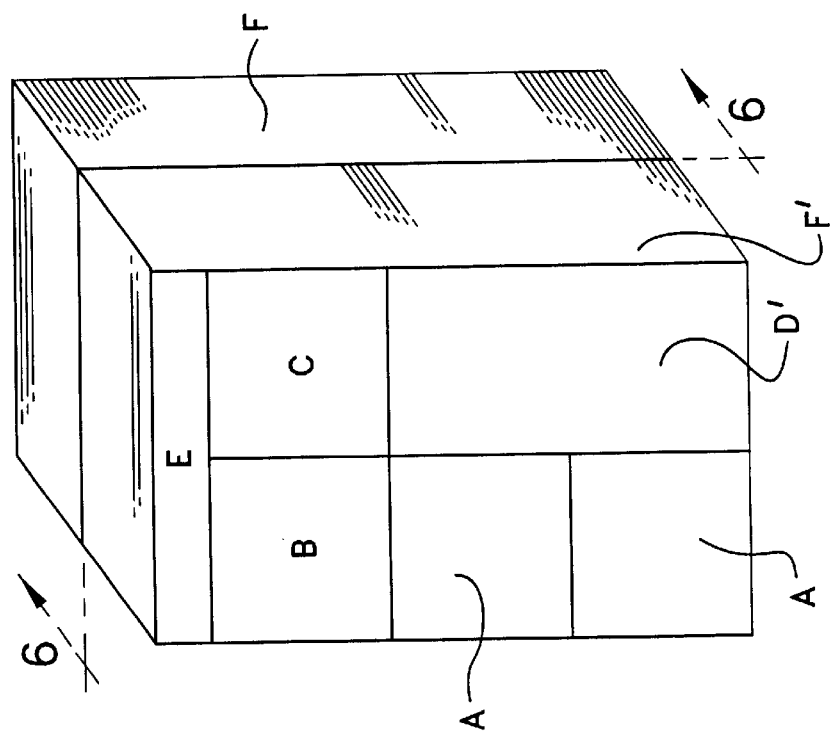
FIG. 5 is a schematic representation, similar to FIG. 3, of an integrated power node control center manifesting aspects of the invention, where the integrated power node control center illustrated in FIG. 5 has more power modules, including modules of differing capacities, than the integrated power node control center illustrated in FIG. 3.
Figure 8:
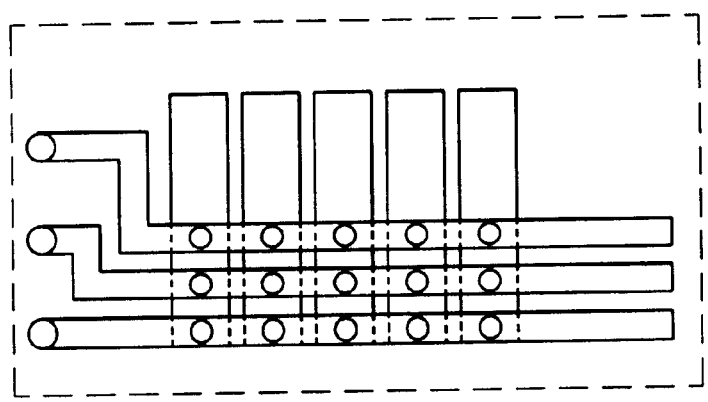
FIG. 8 is a schematic view taken at lines and arrows 8—8 in FIG. 7.

Among the traditional functions and devices which may be provided as a part of the power modules schematically illustrated as A, B, C, and D in FIGS. 3 and 5 of the drawings are that of circuit breaking, motor controlling, transfer switching, transforming, rectification, regulation and inversion. Coventional circuit breakers, motor controllers, transfer switches, transformers, rectifiers, regulators and inverters may be provided as a part of and within these power control modules A, B, C and D.

As is readily apparent from FIG. 4 of the drawings, the power bus backplane module F preferably includes three parallel elongated bus bars along the surface thereof. Power modules A, B, C, and D and protection and operating control module E are preferably self-contained and housed in planar six sided packages with the power modules being adapted for stacking in an arrangement to position the protection and operating control module E at the top of the power modules, where some of the power modules may be in side-by-side or stacked disposition and in any event are in complementally contacting relation.

Typically, separate output power modules B, C, D may be provided for performing distribution functions, switching functions, conversion functions, protection control functions and operating control functions.

Output power modules B, C, D and incoming power module A are inventoried items. The quick disconnect feature of the input and output power modules respecting the power bus backplane module permits rapid replacement of any of the power modules upon failure thereof.

Protection and operating control module B is preferably programmable by the system designer or by an on-site operator, permitting the designer or operator to easily select the functions being performed by protection and operating control module E on site without any change required in hardware.

Protection and operating control module B can be automated by provision of a microprocessor therewithin. Utilization of appropriate artificial intelligence techniques permits optimization of operation of the protection and operation and control functions performed by module E.

The integrated power node control center illustrated schematically in FIG. 2 and in a more concrete form in FIG. 3 and having been designated generally 2 therein preferably includes power modules, A, B, C, and D illustrated there which perform various power functions, as described below. The integrated power node control center preferably may include a great number of power modules. The integrated power node control center preferably also includes a protection and operating control module E, which performs the protection and control functions necessary at the power node, and a power bus backplane, module F.

Figure 2:
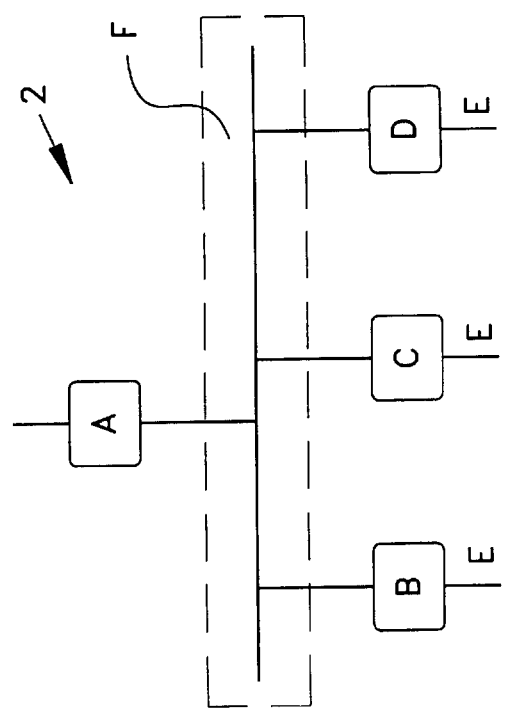
FIG. 2 is a schematic representation of a single power node with control provided to illustrate certain aspects of this invention.

Module A as illustrated in FIGS. 2 and 3 is an incoming module, that is the power from the source enters the node through module A. Module A in this example may switch and hence could be opened or closed. In the open position no power flows into the integrated power node control center power bus backplane module F, whereas in the closed position power enters this integrated power node control center and energizes the power bus backplane. Power module A preferably performs several additional different functions, such as a) transfer switching where two incoming sources are available and it is desired to select from either source, with the ability to transfer to the alternate source should the voltage level of the primary source fall below a prescribed level;

b) inverting/switching to convert the frequency of voltage so that the output frequency provided on the bus structure is different than incoming line frequency;

c) voltage transforming/switching convert voltage such that the voltage level on the bus structure is different than voltage level on the incoming line; or d) any combination of these functions.

Similarly, output power modules B, C, and D perform various power functions, such as load switching, overload switching, switching for motor starting, frequency conversion, voltage transforming, or a combination of these functions depending on the needs of the load being supplied by the output circuits. As illustrated, these modules are preferably connected to and receive power energy from the power bus backplane, module F.

Module E is an operator programmable protection and operating control module. The function of this module is preferably twofold, namely, protection and operating control.

In the protection control function, which is part of the function performed by module E preferably module E monitors the power system for anomalies and then instructs the power modules B, C and/or D to take appropriate action to restore the power system to normal condition. The protection control function preferably includes sensors which monitor various parameters of the power system at the node that is within the integrated power node control center 2. The parameters may be several such as current, voltage, frequency, temperature and vibration. The sensors preferably are incorporated within the power modules A, B, C and D, or within the power bus backplane, module F. The type of protection strategy employed depends on the power system, but may include current overload, power overload, power direction, phase current unbalance, differential current, overvoltage, undervoltage, overfrequency. According to the protection strategy, protection control module E issues appropriate instructions to one or more of the power modules B, C, D and/or to some other integrated power node control center 2 or a central control station if the threshold level of any protection characteristic were exceeded.

In the operating control function, which is also a part of the function performed by module E, preferably module E monitors the system to assure that the power system is supplying the correct type of power to the loads selected by the operator. In performing the operating control function module E also preferably senses the power system parameters at the integrated power node control center. The sensors are the same ones as used for protection control plus others which sense the state of the power modules A, B, C, D, that is whether they are open (non-conducting) or closed (conducting). The operating control might also monitor the physical state, that is whether the power modules A, B, C, D, are connected to the power bus backplane defined by module F or are only partially inserted into the integrated power node control system enclosure but in a disconnected position. In performing the operating control function, module E may preferably provide a human interface to receive an operator's instructions regarding the behavior or state of one of the power modules A, B, C, and/or D; the operator could, through operating control, instruct power module A through control module E to close or begin conducting.

Operating control at each integrated power node control center 2 may also gather and store data regarding the condition of the power system at the integrated power node control center 2 location, and data on the functioning of the power modules A, B, C, and D within the integrated power node control center 2. Diagnostic monitoring of the power modules A, B, C, D may also be performed and the data evaluated for maintenance or other purposes. The operating control portion of module E of the center 2 preferably may also communicate with other integrated power node control centers 2 and/or the electrical power system central control. The operating control function portion of module E is preferably further a data collection and processing station for data from the loads connected to integrated power node control center 2 and have the capability of transmitting the data to central control.

The power bus backplane module F preferably is a bus structure constructed preferably of either copper or aluminum bus bars of several different types of configuration, e.g. rectangular bars, round tubes, round rods, channels, or triangular shaped bus; these shapes have not been illustrated to assure drawing clarity. The power bus backplane preferably is so-arranged that the power modules A, B, C, D connect directly to the power bus backplane. This bus structure contains protrusions or other means whereby the power modules A, B, C, D "automatically" attach, and may even literally snap to the power bus backplane in quick disconnect fashion.

The power bus backplane module F is constructed for both AC and DC operation. The power bus backplane module F preferably may also include submodules of power bus backplanes, such that a submodule is inserted into a high power bus backplane to create a low power bus backplane to accommodate low capacity power modules. This is illustrated in FIG. 5 where D' denotes a low power module that connects to a low power bus backplane F' which in turn fits into and connects with high power bus backplane module F.

The power modules A, B, C, D which connect to the power bus backplane module F are preferably electrical/mechanical devices. They are constructed to perform the intended function. There are some power modules which are switching modules, which are constructed as electro/mechanical switching devices with electrical contacts opened or closed via mechanical mechanisms, or they may be power electronic switching devices or other means such as conducting polymers, depending on the power capability as relates to size and cost. As new affordable technologies become available for switching they can also be accommodated. The switching devices are rated according to power capability, voltage and frequency as well as function. Switching devices cover the functions of no-load breaker disconnect, load break disconnects, fault current break disconnects, and transfer switches.

At some future time energy power switching modules may embody all switching functions, depending on the economics of either approach.

Power conversion modules preferably are power electronics for frequency conversion, commonly referred to as rectifiers or inverters, and magnetics for voltage conversion, commonly referred to as transformers. Power conversion modules are preferably constructed to fit into the same enclosure opening as the power switching modules, thus allowing flexibility of function for the integrated power node control center. Power conversion modules are preferably made in various power ratings according to voltage input/output and according to frequency input/output.

As technologies develop each power module A, B, C, D preferably may be capable of performing any function, that is, switching, frequency conversion and voltage conversion.

The design of the integrated power node control center is such as to allow or easily accommodate upgrades in technology for switching and conversion.

The control module E preferably includes a control backplane to which various circuit cards are inserted. Each circuit card preferably performs a control function, either protection control or operating control. There are preferably a number of circuit cards for protection control, each of which process the desired characteristic, such as current overload, differential current, out of phase current, ground current, over/undervoltage, over/under frequency, temperature or any other parameter found to be necessary for proper protection of the electrical system. These may be separate circuit cards, or one circuit card can process a multitude of functions.

Similarly, the operating control function is preferably on various circuit cards which are also inserted into the control backplane of control module E. These operating control circuit cards preferably perform the various control functions associated with the electrical system control and with equipment diagnostic control. There are preferably also circuit cards which control the communications with other integrated power node control centers 2 and with the central power system control. The control function thus incorporates data processing and data storage capabilities. It also has provisions for display. These circuit cards contain components for analog and digital processing control.

The data being sensed is preferably done via sensors located within the power modules or located within the load equipment being supplied from the integrated power node control center 2. Data from different environments can also be obtained. All the sensors are connected to the control backplane and their data are available to the circuit cards for processing, as each is instructed according to the demands of the operator or system designer. The sensors can be magnetic sensing devices, shunt devices, capacitor devices, fiber optic devices or any other type of sensor suitable for the application.

The control backplane may also preferably be connected to the circuit cards for transmitting process data to the power modules or to other equipment for information or action. The control backplane also preferably receives input signals from central control or from other integrated power node control centers.

The integrated power node control center 2 is preferably enclosed in a metal enclosure. There are different frames, that is, vertical sections, with each standard vertical section being capable of accepting or housing the proper vertical backplane and the power modules for a particular power level. There are vertical frames rated for various power levels according to frequency and voltage and type of systems i.e. single phase or three phase. A family of frames are constructed according to power ratings. Frames are then preferably combined to form the desired integrated power node control center for the electrical system application.

The frames, power modules and control modules are preferably standardized such that each will be assigned a set of catalog numbers. This permits ordering an integrated power node control center via a catalog number.

Figure 6:
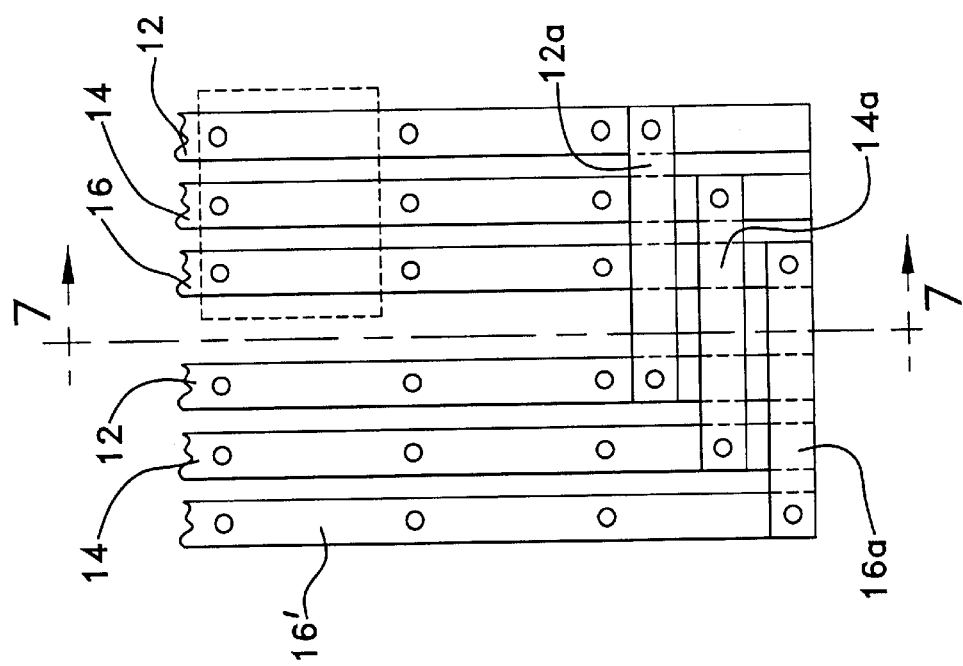
FIG. 6 is a schematic sectional view taken at arrows 6—6 in FIG. 5.

FIG. 6 is a sectional view taken along line 6—6 of FIG. 5 to show a modified kind of power module back plane. In this arrangement the bus bars 12, 14, and 16 are similar to those shown in FIG. 4, except that they extend in parallel only across half the node. These bus bars may be connected to module C and F' quite readily. Since the bus bars 12, 14 and 16 extend only half way across the node, in order for other modules to connect to any of the bus bars the same power connections are provided by parallel bus bars 12', 14', and 16' connected respectively to bus bars 12, 14, and 16 by ties 12a, 14a and 16a, respectively.

In FIG. 6 the dashed box represents the position of module C.

Figure 7:
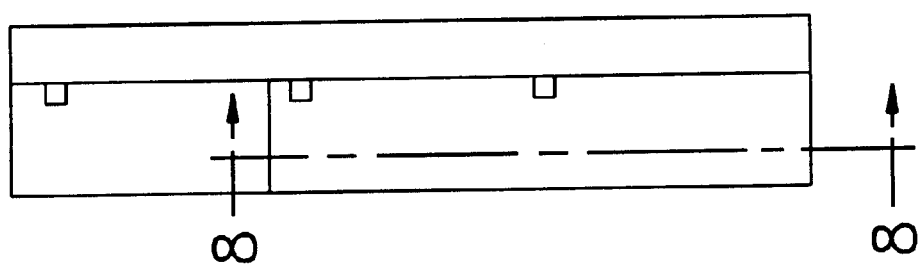
FIG. 7 is a schematic sectional view taken at lines and arrows 7—7 in FIG. 6.

FIG. 7 is a sectional view taken along the section line 7—7 in FIG. 6, so that only bus bar 16 is seen. In view of the positioning of the modules relative to the bus bars in FIG. 5, it will be apparent that modules C and F' can be connected to a choice of bus bars 12, 14 or 16, whereas modules B, A and A may be connected to a choice of bus bars 12', 14' and 16'.

While the preferred embodiment of the invention has been described above and alternative embodiments have also been described, the scope of protection to which the invention is believed entitled is defined by the claims and by equivalents thereto which perform substantially the same function in substantially the same way to achieve substantially the same result as set forth in the claims, so long as such substantial equivalents, as defined by a claim for such substantial equivalent, do not read on the prior art.

What is claimed is:

1. An integrated electrical power distribution system employing modular nodes comprising:
   a. a plurality of nodes having at least one functional module each having means for connection to a load;
   b. a power supply module in said nodes incorporating at least one bus bar and providing means of connection of a system power source to said at least one bus bar and means of electrical connection to and mechanical support from said at least one bus bar of functional modules in the node.

2. The integrated power distribution system of claim 1 wherein an output function performed in the course of controlling power flow in a module includes one or more functions selected from the group including switching, voltage conversion, frequency conversion, and voltage regulation.

3. The integrated power distribution system of claim 1 wherein each modular node further comprises:
   a. said plurality of bus bars being incorporated into a control back plane at each node for accommodating any power distribution modules, functional modules and any control modules required by the node.

4. The integrated power distribution system of claim 3 further comprising:
   a. a node comprising at least one operating control module and one protection control module each adapted for connection to said bus bars for performing one or more of said control functions.

5. The integrated power distribution system of claim 4 having at least one node comprising a control module having control capabilities for controlling one or more functional modules selected from a group of protection control functions including but not limited to overcurrent protection, ground current protection, over and under voltage protection, over and under frequency protection, differential current protection, phase current imbalance protection, open phase protection.

6. The integrated power distribution system of claim 5 further comprising a plurality of adjoining control modules for performing one or more functions selected from a group of operating control functions including but not limited to state monitoring of all inputs and all outputs, health monitoring of all functional power distribution devices, diagnostic monitoring of the control functions, communicating control information to a central control station or other integrated power node control centers, receiving and operating on information and commands from the central control station or other integrated power node control centers, and displaying information of the power node control center.

7. The integrated power distributing system of claim 5 wherein said control modules adjoin said functional modules.

8. The integrated power distribution system of claim 7 wherein said control module is selectably programmable to control performance of one or more of said functional modules.

9. The integrated power distribution system of claim 1 wherein said functional modules are vertically and horizontally adjacent.

10. The integrated power distribution system of claim 1 wherein said back plane includes a plurality of bus bars at the surface thereof and said connecting means of said functional modules connect each functional module with at least one of said bus bars.

11. The integrated power distribution system of claim 10 wherein said bus bars carry AC or DC power.

12. The integrated power distribution system of claim 10 wherein said bus bars are parallel for DC, or arranged in a quasi-parallel structure for AC.

13. The integrated Dower distribution system of claim 10 wherein said bus bars have planar surfaces arranged in the node so that said functional modules lie in parallel planes to those planar surfaces.

14. The integrated power distribution system of claim 13 wherein said functional modules are externally configured as rectangular solids.

15. The integrated power distribution system of claim 14 wherein said control and functional modules complementally contact.

16. The power distribution system of claim 1 in which a plurality of functional modules are included in at least one node in which the modules are geometrically configured to present faces conforming to one another and to fit together so as to further support the functional modules in the node.

17. The power distribution system of claim 16 in which at least one power supply module incorporates more than one bus bar and provides connection of different functional modules in the node to at least one bus bar.

18. The power distribution system of claim 17 in which a control module is incorporated into a node having multiple functional modules, configured with at least one conforming to conforming surfaces of functional modules against which the control module rests and arranged to control at least one functional module to which the control module is coupled.

19. An electrical power system comprising:
 a. a plurality of branches for carrying power including;
  i. branches for distributing power within said system to various loads; and
  ii. at least one branch for connection to a power supply; and
 b. node means, connecting said power supply branches and load branches, for selectably functionally controlling power flow between said power supply and load branches;
wherein functions performed by said node means in the course of controlling power flow includes one or more functions selected from the group including distribution, switching, voltage conversion, frequency conversion, voltage regulation, over current protection, voltage inversion and voltage rectification; wherein said node means further comprises:
  i. a backplane having at least one bus bar at the surface thereof; and
  ii. at least one control module for controlling performance of selected functions, having a generally planar side with means thereon for complementally electrically connecting said control module with at least one bus bar;
wherein said system further comprises:
 c. at least one functional module in said node means for performing one or more of said functions responsively to input from said control module, having a planar side with means thereon for complementally electrically connecting said functional module with said bus bar; and
 d. a plurality of adjoining functional modules for performing one or more of said functions, having planar sides with means thereon for complementally electrically connecting said modules with said bus bar;
wherein said functional modules are vertically and horizontally adjacent to one another and planar sides of control and performance modules are abutting.

20. An electrical power system comprising:
 a. a plurality of branches for carrying power including;
  i. branches for distributing power within said system to various loads; and
  ii. at least one branch for connection to a power supply; and
 b. node means, connecting said power supply branches and load branches, for selectably functionally controlling power flow between said power supply and load branches;
wherein functions performed by said node means in the course of controlling power flow include one or more functions selected from the group including distribution, switching, voltage conversion, frequency conversion, voltage regulation, over current protection, voltage inversion and voltage rectification; wherein said node means further comprises:
 i. a backplane having at least one bus bar at the surface thereof; and
 ii. at least one control module for controlling performance of selected functions, having a generally planar side with means thereon for complementally electrically connecting said control module with at least one bus bar;
wherein said system further comprises:
 c. at least one functional module in said node means for performing one or more of said functions responsively to input from said control module, having a planar side with means thereon for complementally electrically connecting said functional module with said bus bar; and
 d. a plurality of adjoining functional modules for performing one or more of said functions, having planar sides with means thereon for complementally electrically connecting said modules with said bus bar;
wherein at least one of said functional modules facingly adjoins said control module.

21. The system of claim 20 wherein said control module is selectably programmable to control functional of one or more of said functions by said performance modules.

22. The system of claim 21 wherein said bus bars carry AC and DC power.

23. The system of claim 21 wherein said bus bars are parallel.

24. The system of claim 20 wherein said back plane includes a plurality of bus bars at the surface thereof and said connecting means of said functional modules connect each functional module with at least one of said bus bars.

25. The system of claim 20 wherein said control and functional modules have planar surfaces which lie in a common plane.

26. The system of claim 25 wherein said control and functional modules are externally configured as rectangular solids.

27. The system of claim 26 wherein said control and functional modules make complementally electrical contact.

28. The system of claim 27 wherein said bus bars have planar surfaces for complemental electrical contact by said electrical connecting means of said control and functional modules.

29. An electrical power system comprising:
 a. a plurality of interconnected branches for carrying power including a power supply branch connected to a bus bar backplane to enable power to be distributed through other branches within said system;
 b. means for connecting loads to branches other than said branch having said bus bar backplane connected thereto; and
 c. node means, providing at least some connections between branches and loads, for selectably functionally controlling power flow from a power supply to the respective loads, including:
  i. modularly packaged functional modules containing components and circuitry for performance of functions including switching, voltage conversion, frequency conversion, voltage regulation, over current protection, voltage inversion and voltage rectification, selected for performance at said node; and ii. a modularly packaged control module programmable for controlling performance of said selected functions;

d. wherein functional modules common to a node abuttingly facingly contact the bus bars at the surface of the backplane so that terminals from circuits within the modules make electrical connection with said bus bars.

30. The electrical power system of claim 29 wherein said programmable control means of said respective node means are identical.

31. The integrated electrical power node control center of claim 29 wherein said control systems include means for changing system state.

32. The electrical power system of claim 29 wherein said programmable control means are adapted for interconnective control of any of a plurality of modules selected according to functional performance needed at said node.

33. The electrical power system of claim 29 wherein said means for performing said selected function further comprises at least one modularly packaged means for performing said selected function(s) on power flowing between said branches connected by said node responsive to signal from said control means.

34. The system of claim 29 further comprising means for positioning said respective modules for mechanically contacting electrical connection with said bus bar.

35. The system of claim 29 wherein said programmable modularly packaged means at a plurality of nodes are interchangeable and are connectable with a plurality of different ones of said performance modules, said interchangeable control means being selectably programmable to control any of said plurality of different performance modules.

36. An electrical power system comprising:

a. a plurality of branches for carrying power;

a power supply branch connected to a bus bar backplane to enable power to be distributed within said system through other branches connected to bus bars;

c. means for connecting each load to a branch other than said power supply branch; and d. node means providing at least some of the connections between branches, for selectably functionally controlling power flow from power supply to the respective loads, said node means including:

i. functional modules adapted for controlling performance of operational functions including voltage conversion, frequency conversion, voltage regulation, over-current protection, voltage inversion and voltage rectification as selected for control and performance at said node means;

ii. a programmable control module adapted for controlling performance of protection functions including over-current protection as selected for performance at said node means; and iii. modules for performing one or more of said functions having power connection at a modular surface conforming to the modular surface of the power node;

e. wherein said functional modules common to a node means abuttingly facing the power module to connect to a bus bar at the surface thereof and thereby electrically connecting with said bus bar through their respective power connection.

37. An electrical power system comprising:

a. a plurality of branches for carrying power;

b. said branches being interconnected at nodes;

c. power supply means, connected to a branch, for supplying power for distribution within said system;

d. at least one load, consuming power supplied thereto, connected to a branch other than said branch having said power supply means connected thereto;

e. control means for sensing power flow parameters between connected branches and taking protective action within nodes to protect the system in the event one or more of said sensed power flow parameters are outside of preselected limits;

f. control means for sensing power flow parameters between connected branches and in response to sensed power flow parameters regulating operational functions including but not limited to, at least one of the following: voltage conversion, frequency conversion, voltage regulation, over-current protection, voltage inversion and voltage rectification, for continued distribution of quality power within said system;

wherein the control means of elements "e" and "f" are programmable means; wherein the programmable means are at nodes of the system; and wherein a single programmable means at each node performs all of the functions of the means of elements "e" and "f".

38. An integrated electrical power distribution system comprising:

a. a power module comprising a plurality of bus bars supported in a backplane for connection to selected sources of power;

b. a plurality of functional modules each having at least a functional component and circuit having means for connection to a load and having means for connection to bus bars required for a desired type of power for the load; and c. a control module incorporated into the node and controlling at least one functional module and having means to sense a parameter to be controlled and means to modify the performance of that functional module to achieve a desired condition of the controlled parameter.

39. The power distribution system of claim 38 in which the control module incorporates means for sensing a parameter of a controlled functional module and means for modifying the sensed parameter of the controlled functional module according to a predetermined standard of performance available to the control module for comparison with actual performance of the controlled functional module.

40. The power distribution system of claim 39 in which the control module senses an electrical parameter of current flowing through the controlled module and switches the current off under predetermined conditions.

41. The power distribution system of claim 39 in which the controlled functional module contains means for adjustment of the power passing through the module, the means for sensing monitors the controlled function and the control module compares the monitored function and sends signals adjusting the means of adjustment to achieve more nearly the desired performance.

* * * * *